United States Patent [19]
Carlin

[11] Patent Number: 4,953,303
[45] Date of Patent: Sep. 4, 1990

[54] TREE FELLING SPOTTER

[76] Inventor: Paul J. Carlin, 422 N. Austin, Oak Park, Ill. 60302

[21] Appl. No.: 294,302

[22] Filed: Jan. 6, 1989

[51] Int. Cl.$^5$ .............................................. G01C 1/00
[52] U.S. Cl. .......................................... 33/284; 33/277
[58] Field of Search ................. 33/284, 281, 282, 277, 33/276, 278

[56] References Cited

U.S. PATENT DOCUMENTS 794,071  7/1905  Barbow .................................. 33/284

FOREIGN PATENT DOCUMENTS 69570   7/1893  Fed. Rep. of Germany ........ 33/282
102067  7/1941  Sweden ................................. 33/284

Primary Examiner—Harry N. Haroian
Attorney, Agent, or Firm—R. A. Giangiorgi

[57] ABSTRACT

Disclosed is a specialized sextant of the clinometer type capable of providing the translation of the height of a tree (or any finite line) to a distance along the ground, (or any other orientation sharing a common end point with the first line) on any selected slope of the terrain.

A significant aspect is that by two adjustments, made anywhere within sight of the tree (or finite line) the device directs the user to a point on the ground (or other orientation) which lies at the exact distance from the tree's base that the tree's length is. If the tree is to be cut down, the point on the ground where the top of the tree will hit is located. This is accomplished without scales, calculations, tape measurements, or target settings.

1 Claim, 1 Drawing Sheet

TREE FELLING SPOTTER

The present invention relates to sextants and more particularly to specialized sextants capable of translating finite lines to other orientations by sighting only. An object of the present invention is to provide a sextant for the above purpose which is quick and simple to use and simply constructed. A feature of the invention is a sextant with two independent movable arms.

Other objects, features, and advantages of the invention may be best understood by reference to the following detailed description taken in conjunction with the accompanying drawings in which like reference numerals indicate like parts and in which.

Figure 1:
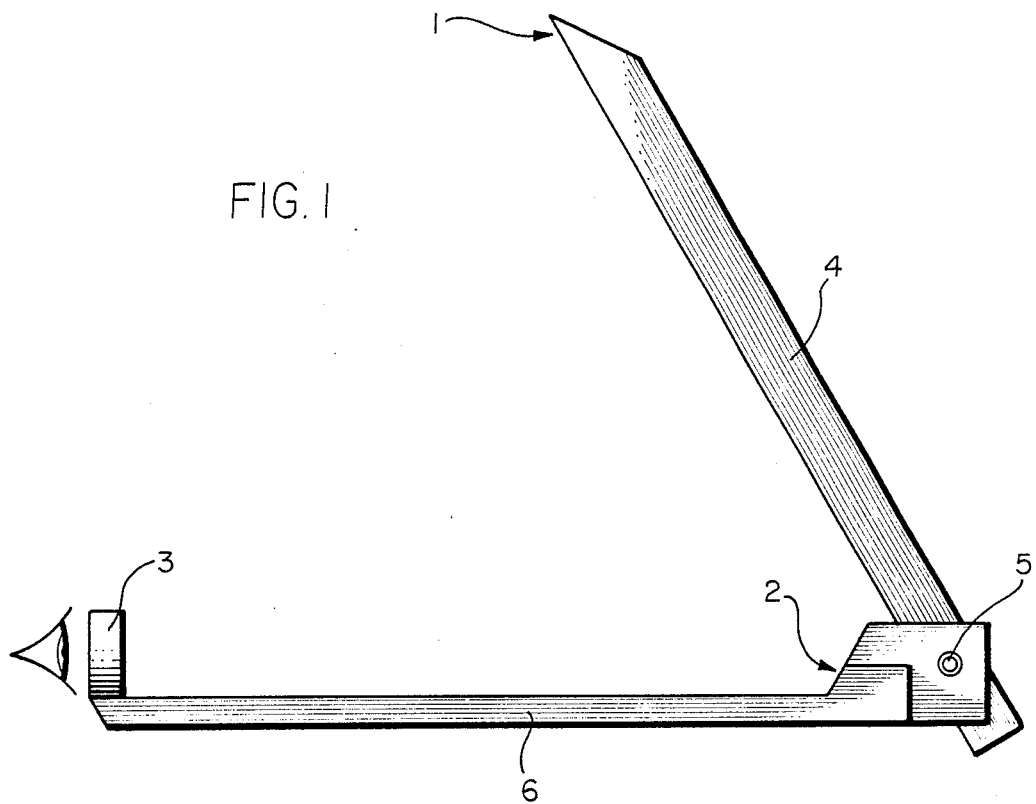
FIG. 1 illustrates the complete sextant from the side with the eye sighting through it.

Referring to FIG. 1, the two movable arms 4 and 6 are joined by axle 5. On member 6 is the sighting ring 3 and the lower sight 2. The upper sight 1 is on arm 4.

Figure 2:
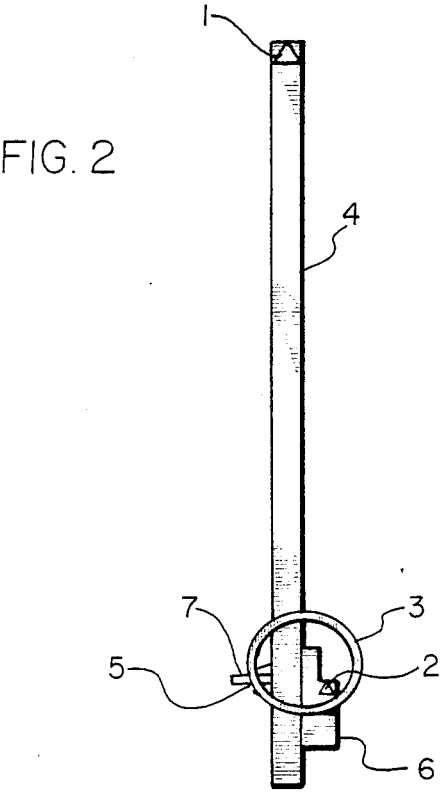
FIG. 2 illustrates the sextant from the viewing side with sights.

Referring to FIG. 2, the sighting ring 3 upon which the eye is pressed is shown along with sights 1 and 2 shown as triangles. The arms 4 and 6 are kept snug together by the wing nut 7 on the axle 5.

Figure 3:
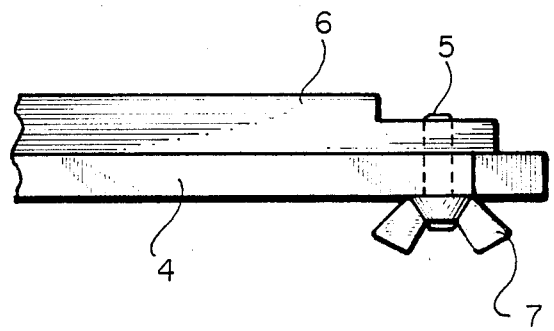
FIG. 3 illustrates in more detail the construction near the front sight and axle.

Referring to FIG. 3, the detail of the axle end of the device is shown in a better view, with the two movable arms 4 and 6, the axle 5, and the wing nut 7. It is crucial to the design that the distance from the tip of sight 1 to the center of axle 5 is exactly equal to the distance of axle 5 to the sherical center of the user's eyeball placed flush against the eyepiece 3. The radius of the eye for the purpose of this patent will be taken to be 0.6 inch.

OPERATION

The device according to described embodiment is a two adjustment sextant capable of translating a finite line to a second orientation sharing an end point with the first line. Operation is accomplished as follows. Bring the device to where you estimate the point on the ground that you are seeking is close to.

Step One: The first adjustment is to align arm 6 parallel to a line from your eye to your eye's height above the ground on the tree as measured from the base of the tree.

Step Two: While maintaining this alignment of arm 6, the second adjustment is to align arm 4 parallel to the tree.

Step Three: Now raise the device to your eye. Place the eyepiece 3 flush against your eye and look out through it to the tip of sight 2, the tip of the triangle. Sight the point on the tree equal to your eye's height above the ground. Now turning your eye upward without moving your face or the device look over the tip of sight 1. If you see the top of the tree, then the distance from the center of your eyeball to the trunk at your eye's height above the ground is equal to the height of the tree minus your eye's height above the ground. This is theoretically exact when the vertical is a one dimensional finite line and the distance from the center of the user's eyeball to axle 5's center equals the distance from the tip of sight 1 to axle 5's center.

In sighting, if the top of the tree is not seen at sight 1, then walk either forward or backward until the top is seen. If the ground is not linear, it is necessary now to repeat all three steps and to continue repeating all three steps until the desired accuracy is obtained.

It is to be understood that the described embodiments are merely illustrative of the invention. Numerous other arrangements may be devised by those skilled in the art without departing from the spirit and scope of the invention as defined by the appended claims.

What is claimed is:

1. A clinometer type apparatus for translating a substantially vertical height to a generally non-perpendicular horizontal length along any pre-existing slope, said slope being generally non-perpendicular to said substantially vertical height, said apparatus comprising: a first elongate member and a second elongate member, said first and second elongate members being operatively attached to a common axis and being independently movable rlative to one another about said common axis through an arc of at least one-hundred eighty degrees (180°), sight means operatively attached to said first elongate member distal said common axis for sighting along a line extending therefrom through a forward sight means adjacent said common axis and for sighting along a line extending therefrom and intersecting an end of said second member distal said common axis and a top end of said substantially vertical object; said first member being aligned generally parallel with the generally non-perpendicular slope from which said substantially vertical object projects and said second member being aligned generally parallel with said substantially vertical object, said generally non-perpendicular length of said substantially vertical object being determined at a point along said slope when, with said first and second members adjusted in generally parallel alignment with respect to said slope and said vertical object, said sight means intersects a line formed between said end of said second member and said top end of said substantially vertical object; wherein said second elongate member has a first length measured from said common axis to said end of said second member and said first elongate member has a second length measured from said common axis to said sight means which is 0.6 inches less than said first length of said second member, a third length measured when said sight means of said clinometer apparatus is positioned against a user's eye, said third length being measured from the center of the user's eye to said common axis being substantially equal to said first length of said second member for providing dimensionally accurate translations.

* * * * *